US012687350B2

(12) United States Patent
Powell

(10) Patent No.: US 12,687,350 B2
(45) Date of Patent: Jul. 21, 2026

(54) VASCULAR COMPOSITE HEAT EXCHANGER

(71) Applicant: The Government of the United States of America, as represented by the Secretary of the Navy, Arlington, VA (US)

(72) Inventor: Brandon Powell, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 290 days.

(21) Appl. No.: 16/782,955

(22) Filed: Feb. 5, 2020

(65) Prior Publication Data

US 2020/0248976 A1 Aug. 6, 2020

Related U.S. Application Data

(60) Provisional application No. 62/801,149, filed on Feb. 5, 2019.

(51) Int. Cl.
| | |
|---|---|
| *F28F 21/06* | (2006.01) |
| *F28D 9/00* | (2006.01) |
| *F28F 3/12* | (2006.01) |
| *B29L 31/18* | (2006.01) |

(52) U.S. Cl.
CPC .......... *F28F 21/065* (2013.01); *F28D 9/0031* (2013.01); *F28F 3/12* (2013.01); *B29L 2031/18* (2013.01)

(58) Field of Classification Search
CPC ........ B32B 9/007; B32B 9/005; F28F 21/065;
F28F 3/12; F28F 2255/08; F28F 2255/06;
F28F 2275/025; F28D 9/0031; B29L
2031/18; B23P 15/26
USPC ...................................... 29/890.032
See application file for complete search history.

(56) References Cited

U.S. PATENT DOCUMENTS

| | | | | | |
|---|---|---|---|---|---|
| 4,099,928 | A | * | 7/1978 | Norback | B21D 22/027 |
| | | | | | 29/890.039 |
| 4,411,310 | A | * | 10/1983 | Perry | B29C 66/438 |
| | | | | | 165/DIG. 183 |
| 4,758,385 | A | * | 7/1988 | Acker | F28F 13/185 |
| | | | | | 261/153 |
| 4,815,534 | A | * | 3/1989 | Fuerschbach | F28F 13/12 |
| | | | | | 165/166 |

(Continued)

FOREIGN PATENT DOCUMENTS

| | | |
|---|---|---|
| EP | 1285213 B1 | 4/2005 |
| GB | 2501413 B | 6/2017 |

(Continued)

OTHER PUBLICATIONS

International Preliminary Report on Patentability Chapter I, dated Aug. 10, 2021, from Related PCT/US2020/016859 (6 pages).

(Continued)

*Primary Examiner* — Tho V Duong
(74) *Attorney, Agent, or Firm* — US Naval Research Laboratory; Nigel R. Fontenot

(57) ABSTRACT

A vascular composite heat exchanger includes a first fluid network sandwiched between upper and central plies; and a second fluid network fluidly isolated from the first fluid network sandwiched between the central and lower plies.

6 Claims, 3 Drawing Sheets

(56)     References Cited

U.S. PATENT DOCUMENTS

| 8,636,269 | B2 * | 1/2014 | James | F28F 25/087 |
| | | | | 261/153 |
| 10,208,979 | B2 * | 2/2019 | Grinbergs | F24F 12/006 |
| 2004/0050532 | A1 | 3/2004 | Yamaguchi et al. | |
| 2016/0091265 | A1 * | 3/2016 | Aramaki | C08K 3/105 |
| | | | | 165/185 |
| 2016/0172725 | A1 * | 6/2016 | Moser | B29C 70/46 |
| | | | | 264/153 |
| 2017/0356690 | A1 * | 12/2017 | Nakamura | F28F 1/16 |

FOREIGN PATENT DOCUMENTS

| JP | 2004-042247 A | 2/2004 |
| JP | 5490265 B2 | 5/2014 |

OTHER PUBLICATIONS

International Search Report from Related PCT/US2020/016859, dated Sep. 15, 2020, from Related PCT/US2020/016859 (3 pages).
Written Opinion of the International Searching Authority, dated Sep. 15, 2020, from Related PCT/US2020/016859 (5 pages).
Google Patents Translation of EP 1285213 (8 pages).
Abstract Translation of JP 2004-042247 (1 page).
Drawings Translation of JP 2004-042247 (6 pages).
Specification Translation of JP 2004-042247 (12 pages).

\* cited by examiner

120 Upper Plies
110 Cold Network
130 Central Plies
140 Hot Network
150 Lower Plies

VASCULAR COMPOSITE HEAT EXCHANGER

RELATED APPLICATIONS

This application claims the benefit of U.S. Provisional Application No. 62/801,149 filed Feb. 5, 2019, which is hereby incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 109601.

FIELD OF INVENTION

The present invention relates generally to heat exchangers, and more particularly to vascular composite heat exchangers.

BACKGROUND

Thermal management of power-dissipating components represent a unique challenge in the design of naval architecture. This is generally performed using a pumped loop of some working fluid. There is a thermal front end, a pump (or compressor and expansion valve, for a refrigeration cycle), and a heat exchanger to expel heat out of the system into another working fluid. Conventionally, these heat exchangers are made from metallic compounds, and commonly are shell-and-tube designs for naval applications.

SUMMARY OF INVENTION

While conventional heat exchangers are highly efficient from a heat transfer standpoint, they are very heavy and take up a significant volume. There are other types of heat exchangers, such as plate type or fin tube type, however each of them also takes up a significant amount of volume. While this may be acceptable when there is a large working area, such as on an aircraft carrier, a flatter heat exchanger may be required for applications when space is limited, such as on an aircraft or on a submarine. Additionally, the weight implications of the heat exchanger itself can be significant, so for applications when weight must be minimized using a standard heat exchanger may not be feasible.

Therefore, presented herein is a lightweight, conformable, and thin heat exchanger that allows for heat transfer with reduced size and weight implications.

According to one aspect of the invention, a method of making a vascular composite heat exchanger, the method comprising the steps of sandwiching a first fluid network between upper plies and central plies; and sandwiching a second fluid network fluidly isolated from the first fluid network between the central plies and lower plies.

Optionally, the step of sandwiching a first fluid network includes the steps of laying up a first set of plies on a tool; placing a sacrificial material shaped to a desired network geometry on the first set of plies; laying up a second set of plies on top of the first set of plies and network geometry, thereby forming an assembly; curing the assembly; and after the assembly is cured, removing the sacrificial material.

Optionally, the method includes the step of pre-curing a film adhesive around the sacrificial material to hold the sacrificial material in place during the curing step.

Optionally, the step of sandwiching a first fluid network includes the steps of laying up a first set of plies on a first tool having desired network geometry; laying up a second set of plies on a second tool having final part geometry; and gluing together the first and second set of plies using either a wet layup or a film adhesive.

According to another aspect of the invention, a vascular composite heat exchanger includes a first fluid network sandwiched between upper and central plies; and a second fluid network fluidly isolated from the first fluid network sandwiched between the central and lower plies.

The foregoing and other features of the invention are hereinafter described in greater detail with reference to the accompanying drawings.

DETAILED DESCRIPTION

Presented herein is a vascular composite heat exchanger, which may be made using techniques currently being studied to manufacture vascular composite aerospace structures. There are three main benefits of making a vascular composite heat exchanger:

1. The heat exchanger can be made in a very small profile, current vascular composite structures are capable of thicknesses as low as 0.040 in-0.070 in
2. The heat exchanger can be made to fit any profile, as the composite structure's shape is only dependent on the tool used during layup and cure of the structure
3. The heat exchanger will be lightweight, as a carbon fiber and epoxy structure has a specific strength of approximately 9 times that of 1430 steel The combination of all of these benefits result in a lightweight, conformable, and thin heat exchanger that would allow for heat transfer with reduced size and weight implications.

Figure 1:
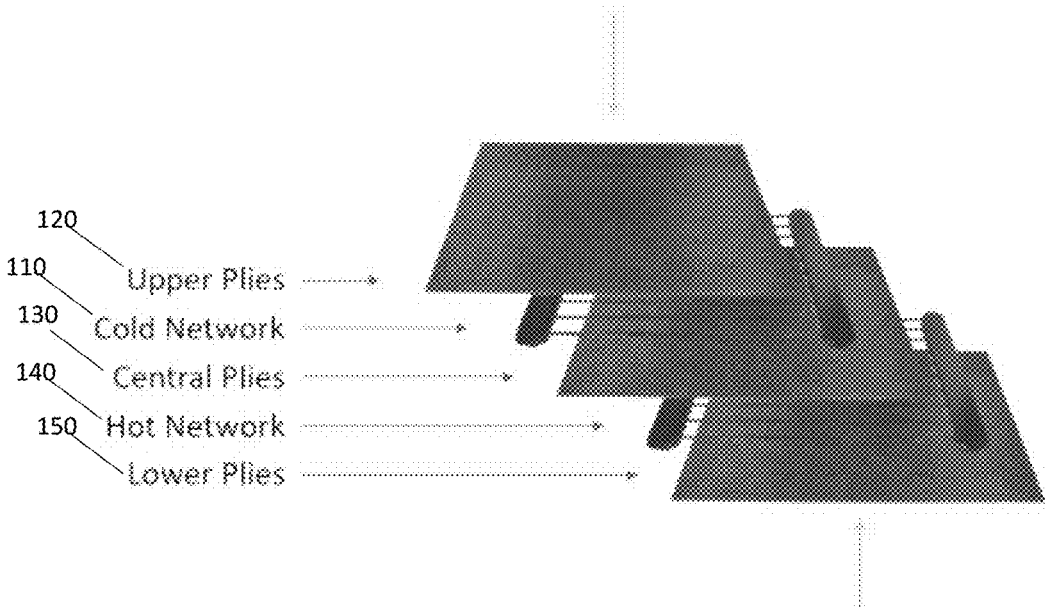
FIG. 1 shows an exploded view of an exemplary vascular composite heat exchanger.

The basic structure outlined in FIG. 1 results in two networks encapsulated in several composite plies, ultimately resulting in a vascular composite with two networks with no interconnectivity. Each of the networks will have its own flow rate and working fluid, with a total of four fluid interfaces to the composite structure (one inlet and one outlet for the hot and cold working fluid). In particular, a first network (e.g., relatively cold) 110 may be sandwiched between upper plies 120 and central plies 130, while a second network (e.g. hot, relative to the first network) 140 may be sandwiched between the central plies 130 and lower plies 150.

Figure 2:
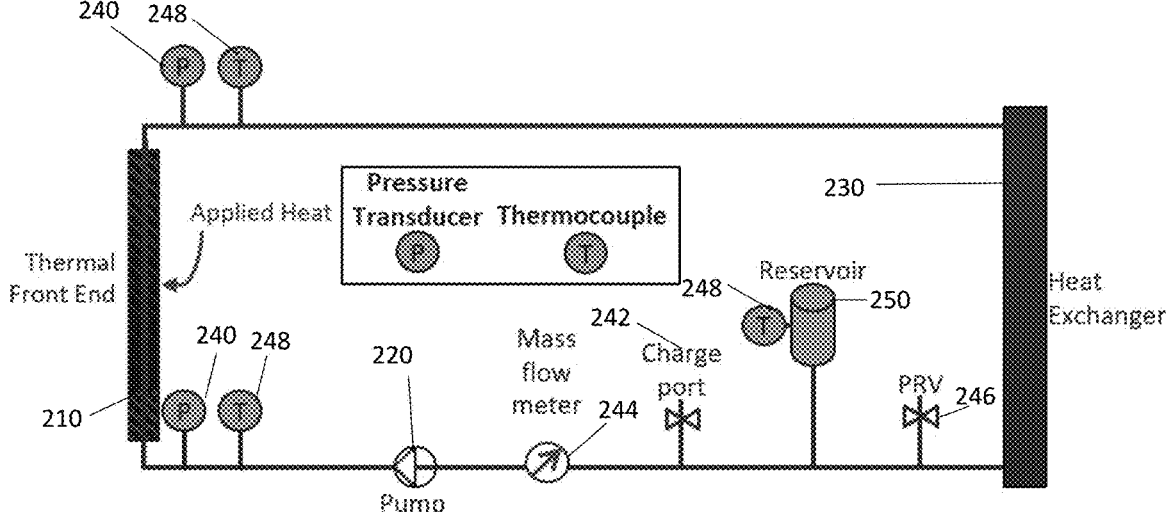
FIG. 2 shows a schematic of an exemplary system with an exemplary vascular composite heat exchanger.

Referring now to FIG. 2, an exemplary system 200 includes a micro-pump 220, a thermal front end 210, and heat exchanger 230 made of the vascular composite. The result is a pumped loop with a liquid-to-vapor phase change occurring in the thermal front end, and a vapor-to-liquid phase change occurring in the vascular composite heat exchanger. Additionally, there may be two pressure transducers 240, a charge port 242, a mass flow meter 244, and a pressure relief valve 246. Three thermocouples 248 may also be used, with one thermocouple 248 on each pressure transducer 240 and one on the fluid reservoir 250. By knowing the pressure and temperature of the refrigerant at the inlet and the outlet of the thermal front end, the vapor quality of the refrigerant can be calculated and used in a control loop to manage the fluid flow (both cold and hot) into the heat exchanger.

One of the primary design drivers for a heat exchanger is the overall heat transfer coefficient, which is related to the geometry of the heat exchanger as well as the total thermal resistance between the hot and cold side of the heat exchanger. Once an overall heat transfer coefficient requirement is determined, working fluid, mass flow rate, and operating temperature ranges are selected given the total heat load required of the heat exchanger. The material and network geometries are then selected such that they can operate in the proper temperature regime and provide the required overall heat transfer coefficient. Additionally, the structural penalty imparted by the vascular network must be minimized if the heat exchanger is load bearing, and the size, weight, and power (SWaP) implications to the overall system must be minimized.

There is a large trade space of commercially available fibers with unique thermal and structural properties. All carbon fibers can be classified as either PAN-based or pitch-based. PAN-based carbon fibers are created by carbonizing Polyacrylonitrile (PAN), a synthetic thermoplastic resin. Similarly, pitch-based carbon fibers are created by carbonizing pitch, a viscoelastic material typically derived from crude oil. Both processes ultimately result in a carbon fiber; however, the resulting material properties of the fibers differ. In general, PAN-fibers have approximately twice the strength, half the stiffness, and one-sixth the thermal conductivity of pitch-based fibers. Due to their higher strength and lower overall cost, PAN-based fibers account for approximately 90% carbon fiber market share and are used in the majority of CFRP structures.

It should also be noted that due to the very high stiffness and lower strength, these pitch-based fibers are more brittle than PAN-based fibers. As a result, additional considerations must be kept in mind when designing the structure and layup schedule; for example, structures with small bend radii and compound curvatures will tend to break pitch-based fibers.

Generally, fibers can either be woven or unidirectional, with several sub-categories of weaves available each with their own unique characteristics.

Ultimately, the combination of fiber and weave will be application-specific. For example, a flat plate with stringent thermal distortion requirements would likely use a pitch-based fiber in a unidirectional prepreg (UDPP) due to the high thermal conductivity of the fibers. In contrast, an object with complex curvatures, sharp corners, and a relatively low thermal gradient requirement would likely be made using a PAN-based fiber in a 5 harness-satin weave due to the low stiffness of the PAN-based fiber and the conformal nature of the weave.

An important consideration of vascular composite structures is the impact of the network geometry on the manufacturing of the panel, specifically the potential for breaking fibers during the layup and cure. During the manufacturing process, the fibers in each ply contacting the network will be identically the shape of the top of the channels, as shown in FIG. 3.

Figure 3:
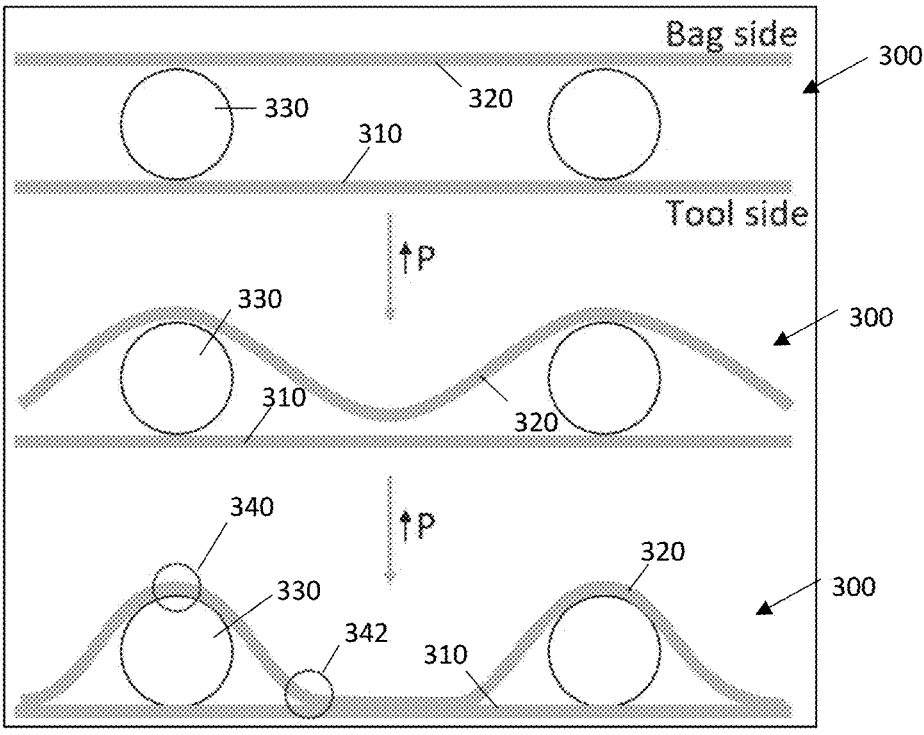
FIG. 3 shows a simplified exemplary method of making an exemplary composite structure.

The upper image in FIG. 3 shows a notional view of the layup 300, in which lower 310 and upper 320 plies are laid up on the tool side and bag side, respectively, with the network geometry 330 inserted in between. As vacuum pressure is applied to the layup (shown in the figure as an increase in P, with the second and third images down having increasing vacuum pressure), the upper plies 320 begin to conform to the network geometry 330. The areas of concern 340, 342 could have fiber breakage due to a very small radius of curvature in the conforming fibers. The first area of concern 340, directly above the network, will have a radius of curvature identical to the radius of the network geometry 330, as they will be pressed together by the bag pressure and cured in position. By combining governing equations (1) and (2), a minimum radius of curvature (3) can be calculated for any fiber, given an elastic modulus (E), ultimate tensile strength ($\sigma_{all}$), and a thickness (t).

$$\sigma = \frac{M\left(\frac{t}{2}\right)}{I} \tag{1}$$

$$\rho = \frac{Ei}{M} \tag{2}$$

$$\rho_{min} = \frac{E \times t}{2\sigma_{all}} \tag{3}$$

Figure 4:
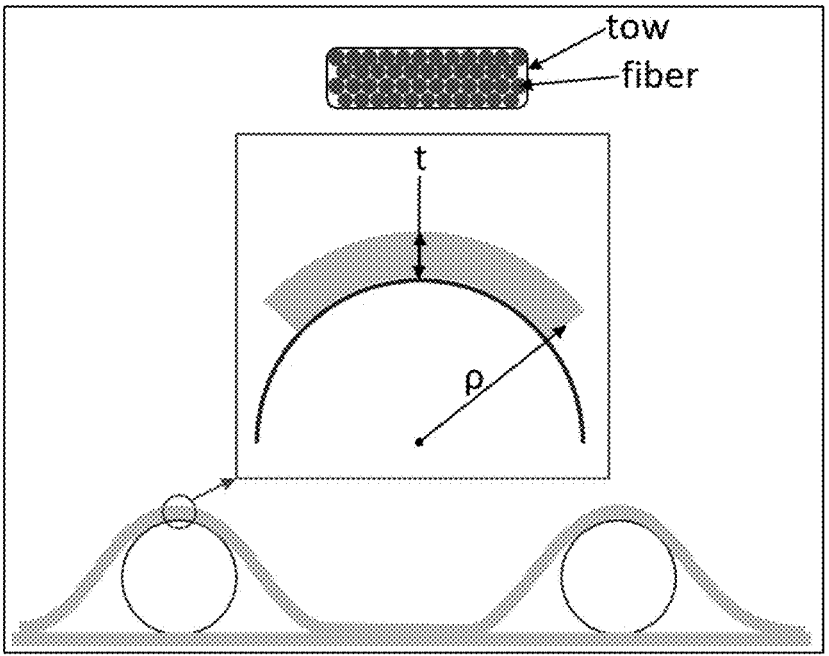
FIG. 4 shows a schematic diagram illustrating composite thickness.

The thickness could be conservatively assumed to be the height of a tow of fibers, or liberally assumed to be the diameter of a fiber. This phenomenon is shown in FIG. 4.

In reality, the effective thickness will fall somewhere in between; the conservative estimate assumes the entire tow acts as one and the liberal estimate assumes each fiber acts individually, but in reality there will be slip among the fibers in a tow with a non-zero frictional force.

A basic test was performed by winding a M55J, AS4, and K13D2U fiber around small rods to determine the actual bend radius where fiber breaking was visually observed, and the result was a realistic approximation for the actual minimum bend radius (4) based on the liberal and conservative estimates.

$$r_{min} \approx r_{lib} + 0.22 \times (r_{cons} - r_{lib}) \tag{4}$$

It should be noted that the realistic approximation (4) falls between the liberal and conservative estimates, as it is inherently bound by the extreme limitations of the two. High strength fibers can be in contact with small network geometries without the risk of fiber breakage. As long as the channels are larger than the minimum allowable size, breaking these high-strength fibers during manufacturing is not a risk. In contrast, stiff pitch-based fibers cannot tolerate small channel diameters without the potential for fiber breakage. This must be avoided, as fiber breakage will provide a potential leak path and degrade the strength, stiffness, and thermal conductivity of the resulting structure.

There are several materials that are used as a matrix in composite structures. The most common are:

Polyester
Epoxy
Phenolic
Cyanate Ester

Polyimide

BMI (Bismaleimide)

Polyester is inexpensive, has a low glass transition temperature, and approximately 50% of the flexural strength of Epoxy. As a result, Polyester resins are typically reserved to cosmetic applications such as automotive components. Phenolics have a low service temperature and only 30% of the strength of a typical Epoxy; however, Phenolics ablate away to protect the underlying structure in a more repeatable and consistent manner, lending themselves useful as a lightweight ablative coating. Epoxy is the most common matrix material, and is widely used in the automotive and aerospace industry due to the significant performance increase over polyester for a modest cost increase. For spacecraft applications Cyanate Ester is the typical matrix material, as it meets NASA outgassing requirements without special additives that degrade the overall performance. Polyimide and BMI are similar in performance and used for high service temperature applications due to their glass transition temperature being over 50% higher than that of Epoxy. Both are significantly more expensive than the other viable matrix materials, and are typically used if the operating temperature cannot be reduced to allow for other materials to be used.

It should be noted that while these are the typical matrix materials for a CFRP, there are several other options that are less commonly used, such as thermoplastics or other non-polymeric materials to yield a non-CFRP composite. For example, a Carbon-Carbon (C—C) composite ultimately results in a carbon fiber reinforced composite with a graphite matrix, which allows for service temperatures of over 1500° C. Ceramic matrices are also common for extremely high service temperature applications. Metallic matrices may also be used to result in a carbon fiber reinforced metallic structure.

There are two primary methods with which the vascular network can be generated; a removable tool, or a non-removable tool. A removable tool will be completely enclosed into the layup during the cure, and removed by either dissolving or evaporating the tool. A non-removable tool, in contrast, will be used to generate a deformation in half of the composite structure (individually cured). After the half of the structure has been cured, it will be glued to another composite structure and result in a vascular network between the two halves. The removable and non-removable tool manufacturing methods are shown in FIGS. 5 and 6, respectively.

Figure 5:
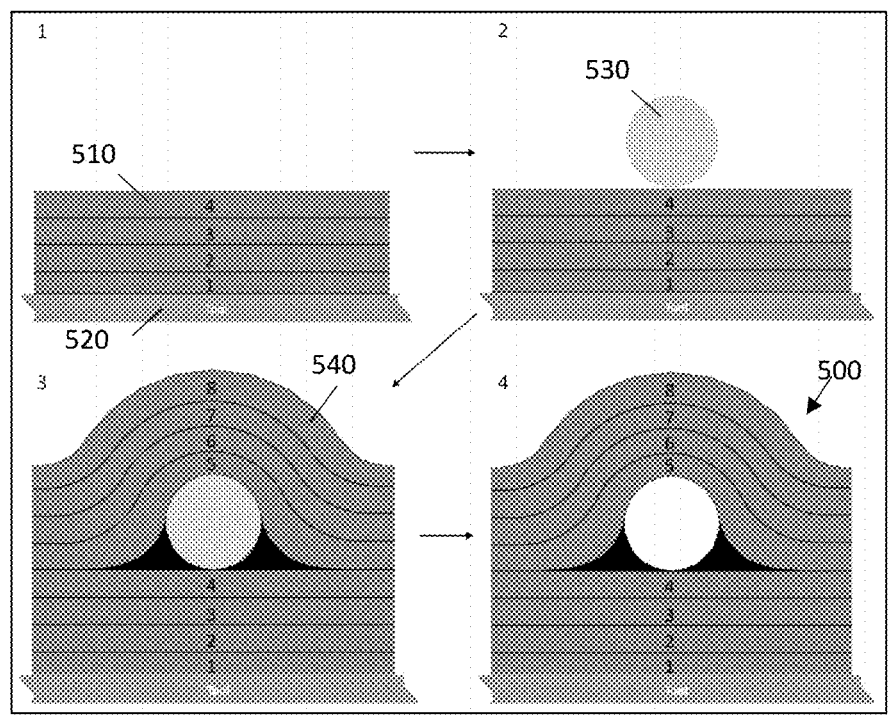
FIG. 5 shows a simplified exemplary method of making an exemplary composite structure using a sacrificial material.

In FIG. 5, the lower plies 510 are laid up on the tool 520 used for manufacturing the part. The network geometry 530, made of a sacrificial material, is then placed on the lower plies 510. The upper plies 540 are laid up on top of the lower plies 510 and network geometry 530, and the part is cured. Then, after the part is fully cured, the network geometry 530 is removed via dissolving, evaporation, or any other method to result in a composite 500 with an embedded network. However, the sacrificial material used to create the vascular network may melt during the part cure, resulting in a deformed network geometry cross-section. Optionally, then, pre-curing a film adhesive around the sacrificial material may be used to prevent this problem by holding the melted structure in place during autoclave cure and isolate it from contaminating any bond faces.

Figure 6:
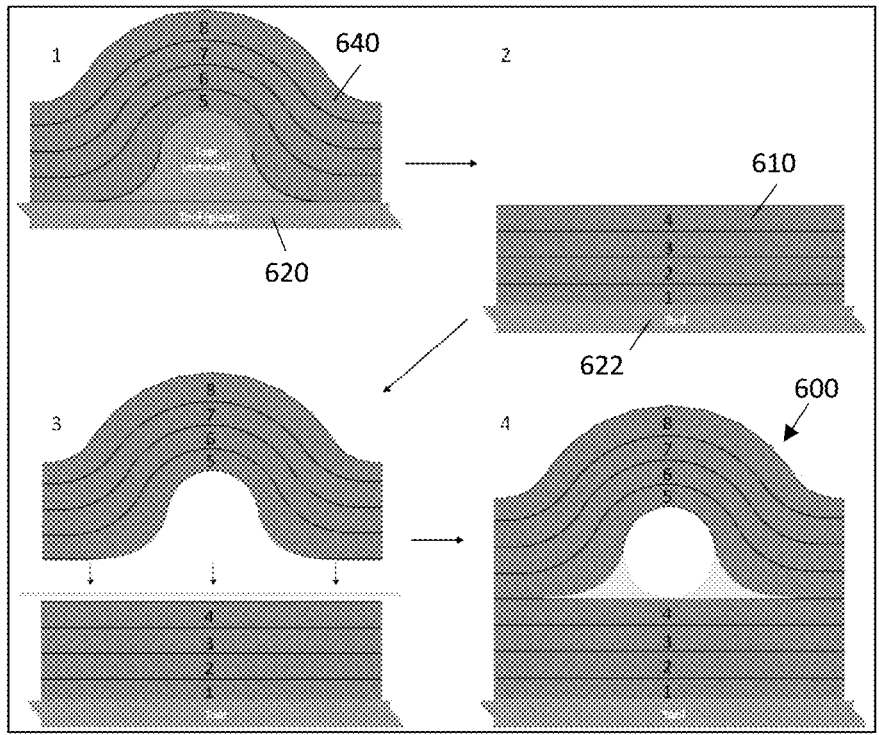
FIG. 6 shows a simplified exemplary method of making an exemplary composite structure without using a sacrificial material

In FIG. 6, the upper plies 640 are first laid up on a tool 620 that contains the network geometry 630. The lower plies 610 are then laid up on a separate tool 622 with the final part geometry. The upper 640 and lower 610 plies are then glued together using either a wet layup or a film adhesive, and the result will be a composite 600 with an integrated network.

Both methods are valid from a manufacturing standpoint, and both have various benefits and downsides. For example, certain materials that degrade at the temperatures needed for removing sacrificial material would require a non-removable tool for manufacturing.

Additionally, there are several methods to making the sacrificial vascular network pattern. Due to the flexibility, cost, and time to manufacture the geometry, additive manufacturing using a Fused Deposition Manufacturing (FDM) extrusion machine (e.g., Ultimaker 3+) has been used. This method is capable of producing geometries as small as 0.015" in diameter. While it can print these small channels, its limited resolution can have a noticeable impact on the surface quality of small network geometries which could affect pressure drop along the network. For fielded systems, it is likely that another manufacturing technique (casting, machining, etc.) would be used to produce smoother and more repeatable geometries at the expense of cost.

The primary utility of a vascular composite heat exchanger is to improve the size, weight, and power impacts of a heat exchanger on the overall system. By allowing for conformal geometries to be built into the heat exchanger, packaging is very simple. Additionally, the relatively low density of composites allows for reduced overall weight of the heat exchanger, and the high thermal conductivity of some carbon fibers can result in high overall heat transfer coefficients.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of making a vascular composite heat exchanger, the method comprising the steps of:

identifying an overall heat transfer coefficient requirement for the vascular composite heat exchanger;

selecting working fluid, mass flow rate, and operating temperature ranges for the vascular composite heat exchanger based on total heat load required of the heat exchanger;

determining material and network geometries of the vascular composite heat exchanger based on operation of the vascular composite heat exchanger in a proper temperature regime associated with the selecting and to provide the identified overall heat transfer coefficient requirement; and based on the determining:

sandwiching a first fluid network between upper plies comprising a composite material having fibers and central plies; and

sandwiching a second fluid network fluidly isolated from the first fluid network between the central plies and lower plies, wherein a thickness of each of the upper plies is between a height of a tow of the fibers and a diameter of one of the fibers, wherein the first fluid network and the second fluid network are each configured to receive a respective working fluid and to operate at a respective flow rate, wherein the first fluid network and the second fluid network each have a respective inlet fluid interface and a respective outlet fluid interface, for a total of four fluid interfaces for the first fluid network and the second fluid network, wherein the thickness is based on a bend radius associated with observed fiber breakage during an observation, wherein a minimum value for the bend radius ($r_{min}$) is determined according to $r_{min} \approx r_{lib} + 0.22 \times (r_{cons} - r_{lib})$, wherein $r_{lib}$ is a liberal value for the bend radius determined based on the observed fiber breakage during the observation and is based on an expectation that each of the fibers in a tow of the fibers acts individually,

wherein $r_{cons}$ is a conservative value for the bend radius determined based on the observed fiber breakage during the observation and is based on an expectation that each of the fibers in a tow of the fibers acts together as one.

2. The method of claim 1, where the step of sandwiching a first fluid network includes the steps of:

laying up a first set of plies on a first tool having desired network geometry;

laying up a second set of plies on a second tool having final part geometry;

gluing together the first and second set of plies using either a wet layup or a film adhesive.

3. The method of claim 1, wherein the fibers are carbon fibers.

4. The method of claim 3, wherein the composite material further comprises an epoxy.

5. The method of claim 1, wherein an orientation of the first fluid network substantially aligns with an orientation of the second fluid network.

6. The method of claim 1, wherein a working fluid of the first fluid network comprises a cold working fluid, and a working fluid of the second fluid network comprises a hot working fluid.

\* \* \* \* \*